United States Patent
Ngo et al.

(10) Patent No.: US 10,437,772 B2
(45) Date of Patent: Oct. 8, 2019

(54) ADDRESSING OF SLAVE DEVICES ON A SINGLE WIRE COMMUNICATIONS BUS THROUGH REGISTER MAP ADDRESS SELECTION

(71) Applicant: Qorvo US, Inc., Greensboro, NC (US)

(72) Inventors: Christopher Truong Ngo, Queen Creek, AZ (US); Alexander Wayne Hietala, Phoenix, AZ (US); William David Southcombe, San Diego, CA (US)

(73) Assignee: Qorvo US, Inc., Greensboro, NC (US)

( * ) Notice: Subject to any disclaimer, the term of this patent is extended or adjusted under 35 U.S.C. 154(b) by 0 days.

(21) Appl. No.: 15/467,790

(22) Filed: Mar. 23, 2017

(65) Prior Publication Data

US 2017/0277651 A1    Sep. 28, 2017

Related U.S. Application Data

(60) Provisional application No. 62/312,893, filed on Mar. 24, 2016.

(51) Int. Cl.
*G06F 13/00* (2006.01)
*G06F 13/42* (2006.01)
*G06F 13/364* (2006.01)
*G06F 13/40* (2006.01)

(52) U.S. Cl.
CPC ........ *G06F 13/4282* (2013.01); *G06F 13/364* (2013.01); *G06F 13/404* (2013.01)

(58) Field of Classification Search
CPC ... G06F 13/4282; G06F 13/364; G06F 13/404
USPC .......................................................... 710/110
See application file for complete search history.

(56) References Cited

U.S. PATENT DOCUMENTS

| | | | |
|---|---|---|---|
| 3,953,835 A | 4/1976 | Cuccio et al. | |
| 5,787,132 A | 7/1998 | Kishigami et al. | |
| 6,408,163 B1 | 6/2002 | Fik | |
| 7,685,320 B1 | 3/2010 | Wishneusky | |
| 9,430,321 B2 * | 8/2016 | Slik | H04L 67/1095 |
| 9,519,612 B2 * | 12/2016 | Hietala | G06F 13/4291 |
| 9,652,451 B2 | 5/2017 | Elder | |
| 2001/0050713 A1 | 12/2001 | Kubo et al. | |

(Continued)

OTHER PUBLICATIONS

Non-Final Office Action for U.S. Appl. No. 14/575,491, dated May 26, 2017, 20 pages.

(Continued)

*Primary Examiner* — Chun Kuan Lee
(74) *Attorney, Agent, or Firm* — Withrow & Terranova, P.L.L.C.

(57) ABSTRACT

A communications system includes a single wire communications bus and a plurality of slave devices, each of the slave devices associated with a common slave identifier. The single wire communications bus is configured to receive a message comprising data, a slave identifier, and a register map address. A respective one of the plurality of slave devices selectively responds to the message if the slave identifier in the message is the same as the common slave identifier associated with the respective one of the plurality of slave devices and the register map address in the message is the same as the register map address associated with the respective one of the plurality of slave devices.

18 Claims, 8 Drawing Sheets

(56) References Cited

U.S. PATENT DOCUMENTS

| | | |
|---|---|---|
| 2004/0049619 A1 | 3/2004 | Lin |
| 2004/0100400 A1 | 5/2004 | Perelman et al. |
| 2004/0128594 A1 | 7/2004 | Elmhurst et al. |
| 2004/0221067 A1 | 11/2004 | Huang et al. |
| 2005/0012492 A1 | 1/2005 | Mihalka |
| 2006/0050694 A1 | 3/2006 | Bury et al. |
| 2006/0152236 A1 | 7/2006 | Kim |
| 2006/0236008 A1 | 10/2006 | Asano et al. |
| 2009/0248932 A1 | 10/2009 | Taylor et al. |
| 2011/0035632 A1 | 2/2011 | Hong et al. |
| 2012/0027104 A1 | 2/2012 | Bas et al. |
| 2012/0030753 A1 | 2/2012 | Bas et al. |
| 2012/0226965 A1 | 9/2012 | Hammerschmidt et al. |
| 2013/0054850 A1 | 2/2013 | Co |
| 2013/0124763 A1 | 5/2013 | Kessler |
| 2013/0132624 A1 | 5/2013 | Chen et al. |
| 2013/0197920 A1 | 8/2013 | Lesso et al. |
| 2013/0265884 A1 | 10/2013 | Brombal et al. |
| 2013/0301689 A1 | 11/2013 | Marchand et al. |
| 2014/0025999 A1 | 1/2014 | Kessler |
| 2014/0376278 A1 | 12/2014 | Fornage et al. |
| 2015/0056941 A1 | 2/2015 | Lin et al. |
| 2015/0074306 A1 | 3/2015 | Ayyagari et al. |
| 2015/0106541 A1 | 4/2015 | Southcombe et al. |
| 2015/0127862 A1 | 5/2015 | Fan et al. |
| 2015/0169482 A1 | 6/2015 | Ngo et al. |
| 2015/0192974 A1 | 7/2015 | Ngo et al. |
| 2015/0193297 A1 | 7/2015 | Ngo et al. |
| 2015/0193298 A1 | 7/2015 | Ngo et al. |
| 2015/0193321 A1 | 7/2015 | Ngo et al. |
| 2015/0193373 A1 | 7/2015 | Ngo et al. |
| 2016/0050513 A1 | 2/2016 | Wang et al. |
| 2016/0124892 A1 | 5/2016 | Amarilio et al. |

OTHER PUBLICATIONS

Non-Final Office Action for U.S. Appl. No. 14/659,379, dated Apr. 7, 2017, 37 pages.
Author Unknown, "1-Wire," Wikipedia, last modified Jan. 16, 2015, accessed Feb. 12, 2015, http://en.wikipedia.org/wiki/1-Wire, 4 pages.
Author Unknown, "DS1822: Econo 1-Wire Digital Thermometer," Maxim Integrated, 2007, 21 pages.
Author Unknown, "Maxim 1-Wire® Tutorial," Maxim, online audiovisual presentation, 17 slides, No Date, accessed Feb. 12, 2015, http://www.maximintegrated.com/products/1-wire/flash/overview/ (38 images of slides).
Awtry, Dan, et al., "Design Guide v1.0," Springbok Digitronics, Aug. 19, 2004, 96 pages.
Non-Final Office Action for U.S. Appl. No. 14/659,292, dated Sep. 29, 2017, 27 pages.
Non-Final Office Action for U.S. Appl. No. 14/659,328, dated Sep. 8, 2017, 51 pages.
Non-Final Office Action for U.S. Appl. No. 14/659,355, dated Sep. 20, 2017, 32 pages.
Non-Final Office Action for U.S. Appl. No. 14/659,371, dated Sep. 25, 2017, 23 pages.
Final Office Action for U.S. Appl. No. 14/659,379, dated Oct. 18, 2017, 44 pages.
Final Office Action for U.S. Appl. No. 14/659,292, dated Apr. 30, 2018, 24 pages.
Final Office Action for U.S. Appl. No. 14/659,328, dated Mar. 20, 2018, 61 pages.
Final Office Action for U.S. Appl. No. 14/659,355, dated Apr. 17, 2018, 11 pages.
Final Office Action for U.S. Appl. No. 14/659,371, dated May 3, 2018, 21 pages.
Notice of Allowance for U.S. Appl. No. 14/659,379, dated Mar. 20, 2018, 10 pages.
Non-Final Office Action for U.S. Appl. No. 14/575,491, dated Nov. 30, 2017, 18 pages.
Advisory Action for U.S. Appl. No. 14/659,379, dated Feb. 26, 2018, 3 pages.
Advisory Action for U.S. Appl. No. 14/659,292, dated Aug. 10, 2018, 3 pages.
Notice of Allowance for U.S. Appl. No. 14/659,328, dated Jul. 2, 2018, 8 pages.
Advisory Action for U.S. Appl. No. 14/659,355, dated Jul. 5, 2018, 3 pages.
Advisory Action for U.S. Appl. No. 14/659,371, dated Aug. 1, 2018, 3 pages.
Ex Parte Quayle Action for U.S. Appl. No. 15/365,315, mailed Jul. 26, 2018, 7 pages.
Notice of Allowance and Examiner-Initiated Interview Summary for U.S. Appl. No. 15/365,315, dated Sep. 14, 2018, 9 pages.
Notice of Allowance for U.S. Appl. No. 15/472,756, dated Aug. 8, 2018, 8 pages.
Non-Final Office Action for U.S. Appl. No. 14/659,292, dated Dec. 21, 2018, 23 pages.
Non-Final Office Action for U.S. Appl. No. 14/659,355, dated Oct. 12, 2018, 8 pages.
Non-Final Office Action for U.S. Appl. No. 15/443,236, dated Nov. 16, 2018, 19 pages.
Non-Final Office Action for U.S. Appl. No. 14/659,371, dated Feb. 26, 2019, 22 pages.
Non-Final Office Action for U.S. Appl. No. 15/365,295, dated Mar. 29, 2019, 15 pages.
Final Office Action for U.S. Appl. No. 14/659,292, dated Jun. 4, 2019, 24 pages.
Final Office Action for U.S. Appl. No. 14/659,355, dated May 2, 2019, 8 pages.
Non-Final Office Action for U.S. Appl. No. 15/886,209, dated May 17, 2019, 7 pages.
Final Office Action for U.S. Appl. No. 15/443,236, dated May 30, 2019, 20 pages.
Final Office Action for U.S. Appl. No. 15/365,295, dated Aug. 15, 2019, 11 pages.

* cited by examiner

ADDRESSING OF SLAVE DEVICES ON A SINGLE WIRE COMMUNICATIONS BUS THROUGH REGISTER MAP ADDRESS SELECTION

RELATED APPLICATIONS

This application claims the benefit of provisional patent application Ser. No. 62/312,893, filed Mar. 24, 2016, entitled "SLAVE ADDRESSING THROUGH REGISTER MAP ADDRESS SELECTION," the disclosure of which is hereby incorporated herein by reference in its entirety.

The present application is related to the following applications: U.S. patent application Ser. No. 14/575,491, filed Dec. 18, 2014, now U.S. Pat. No. 10,185,683, entitled "BUS INTERFACE SYSTEM"; U.S. patent application Ser. No. 14/659,292, filed Mar. 16, 2015, entitled "START OF SEQUENCE DETECTION FOR ONE WIRE BUS"; U.S. patent application Ser. No. 14/659,328, filed Mar. 16, 2015, now U.S. Pat. No. 10,282,269, entitled "READ TECHNIQUE FOR A BUS INTERFACE SYSTEM"; U.S. patent application Ser. No. 14/659,355, entitled "WRITE TECHNIQUE FOR A BUS INTERFACE SYSTEM"; U.S. patent application Ser. No. 14/659,371, filed Mar. 16, 2015, entitled "POWER MANAGEMENT SYSTEM FOR A BUS INTERFACE SYSTEM"; and U.S. patent application Ser. No. 14/659,379, filed Mar. 16, 2015, now U.S. Pat. No. 10,049,026, entitled "GROUP WRITE TECHNIQUE FOR A BUS INTERFACE SYSTEM."

All of the applications listed above are hereby incorporated herein by reference in their entireties.

FIELD OF THE DISCLOSURE

This disclosure relates generally to single wire communication busses, and in particular to ways to address slave devices having a common slave identifier on a single wire communication bus through register map address selection.

BACKGROUND

Modern electronic devices may include a number of functional modules, each of which performs the same or a different function. Often, these modules need to communicate with one another in order to accomplish a larger task. Communications busses are widely used for accomplishing this task. Various standard communications busses currently exist, including inter-integrated circuit (I²C), RS-232, UNI/O, and the like.

Communication bus systems are used to communicate data between components within an electronic device, such as a computer, a radio frequency (RF) front-end (RFFE) module, a cellular telephone, a tablet, a camera, and/or the like. A communication bus system generally includes at least one master controller and one or more slave devices. The master controller(s) and the slave device(s) are connected by a communication bus comprising bus lines, and the master controller coordinates the transfer of data along the bus lines. The slave devices perform commands (e.g., read and write commands) as coordinated by the master controller. If more than one master controller is provided, a bus arbitration scheme is generally implemented to negotiate between the various master controllers. The bus lines that connect the master controller(s) to the slave device(s) typically include one or more data, power, and clock bus lines. Generally, the size of the digital bus interface increases as more bus lines are provided in the digital bus interface. The increase is due to the number of wires which must be routed between the bus controllers and the number of pins for the bus controllers that must be dedicated to the bus lines. In modern communication systems, the area available for pins and wires is minimal.

Messages from the master controller are broadcast on the communications bus and received by all of the slave devices. Each message includes a unique slave identifier (USID) field, which indicates which slave device a message is intended for. Each slave device is associated with a USID, which is hard-coded in memory on the slave device during manufacture. Only the slave device with a USID matching the one in the USID field of a message will respond to the message. Accordingly, communications bus systems typically require every slave device to have a different USID so that the slave devices are uniquely addressable by the master controller.

In RFFE-based communications bus systems such as Mobile Industry Processor Interface (MiPi) radio frequency front end (RFFE) communications bus systems, each communications bus (referred to as an RFFE bus) can address a maximum of 15 different slave devices ($2^4$ or 16 total devices with one master controller). This limitation is based upon a 4-bit USID field within each command sequence used to identify for which slave device the command sequence is intended. This limitation has become a problem in modern wireless communications devices for which the number of RFFE devices has grown.

Today's wireless communications devices typically have many different RFFE busses to expand the number of devices that can be controlled by RFFE within the system. Each additional RFFE bus requires three pins and three wires from the digital section of the phone. The extreme routing and pin density of the system creates a problem.

One method of reducing the problem is to use a single wire communications bus system, such as the single wire micro bus (SuBUS) system by Qorvo, Inc. of Greensboro, N.C. Recently, single wire communications busses have become popularized due to the convenience afforded by reducing routing requirements and possible interference between communication lines. These single wire communications bus systems allow communication with a single wire as opposed to three wires, but the number of required USIDs is not reduced for the same reasons discussed above with respect to MiPi RFFE communications bus systems.

Thus, there is a need to reduce the number of USIDs that are used, but still be able to address a large number of slave devices.

SUMMARY

Embodiments disclosed herein relate generally to single wire communications busses, and in particular to ways to address slave devices having a common slave identifier on a single wire communications bus through register map address selection. In one embodiment, a communications system includes a single wire communications bus and a plurality of slave devices, each of the plurality of slave devices associated with a common slave identifier. The single wire communications bus is configured to receive a message comprising data, a slave identifier, and a register map address. In one embodiment, a respective one of the plurality of slave devices selectively responds to the message if the slave identifier in the message is the same as the common slave identifier associated with the respective one of the plurality of slave devices and the register map address in the message is the same as the register map address associated with the respective one of the plurality of slave devices.

In another embodiment, a slave device for use on a single wire communications bus is disclosed. The slave device has a slave identifier common to at least one other slave device associated with the single wire communications bus. The slave device comprises communications circuitry configured to communicate with one or more other devices via the single wire communications bus. The slave device also comprises functional circuitry configured to selectively determine whether to respond to a message received on the single wire communications bus, based on whether the message includes the common slave identifier and on whether a register map address received in the message is the same as the register map address associated with the slave device.

In another embodiment, a method of communicating on a single wire communications bus is disclosed. The method comprises coupling a plurality of slave devices to the single wire communications bus. Each one of the plurality of slave devices is associated with a common slave identifier. The method comprises receiving a message on the single wire communications bus, the message comprising data, a slave identifier, and a register map address. The method further comprises selectively determining whether to respond to the message received on the single wire communications bus. The method further comprises responding, by a respective one of the plurality of slave devices, to the message received on the single wire communications bus if the slave identifier in the message is the same as the common slave identifier and the register map address in the message is the same as the register map address associated with the respective one of plurality of slave devices In this manner, a group of slave devices (also referred to simply as "slaves" or "SuBUS slaves" if in a single wire communications bus system) on a single wire communications bus can be controlled using a reduced number of unique identifiers, allowing communication for the group of slave devices on the single wire communications bus to be controlled where each unique identifier can be used to address many slaves, thereby alleviating the problem of finite identifiers and address space. A group of slave devices on a single wire communications bus can be assigned the same identifier, and the identifier and a register map address sent in a message on the single wire communications bus can be used to address the appropriate slave device. Only the slave device(s) that are associated with a register map address that matches the register map address in the message will respond to any command in the sent message.

Those skilled in the art will appreciate the scope of the present disclosure and realize additional aspects thereof after reading the following detailed description in association with the accompanying drawings.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

Embodiments disclosed herein relate generally to single wire communications busses, and in particular to ways to address slave devices having a common slave identifier on a single wire communications bus through register map address selection. In one embodiment, a communications system includes a single wire communications bus and a plurality of slave devices, each of the plurality of slave devices associated with a common slave identifier. The single wire communications bus is configured to receive a message comprising data, a slave identifier, and a register map address. In one embodiment, a respective one of the plurality of slave devices selectively responds to the message if the slave identifier in the message is the same as the common slave identifier associated with the respective one of the plurality of slave devices and the register map address in the message is the same as the register map address associated with the respective one of the plurality of slave devices.

In RFFE-based systems, each RFFE bus can address a maximum of 15 different slave devices. This limitation is based upon a 4-bit user slave identification (USID) field within each command sequence used to identify for which slave device the command sequence is intended. This limitation has become a problem in modern cellular telephones for which the number of RFFE devices has grown.

Today's smartphones typically have many different RFFE busses to expand the number of devices that can be controlled by RFFE within the system. Each additional RFFE bus requires three pins and three wires from the digital section of the phone. The extreme routing and pin density of the system creates a problem.

One method of reducing the problem is to use a single wire serial bus interface (SuBUS) system. Recently, single wire communications busses have become popularized due to the convenience afforded by reducing routing requirements and possible interference between communication lines. This SuBUS system allows communication with a single wire as opposed to three wires, but the number of required USIDs is not reduced.

Thus, there is a need to reduce the number of USIDs that are used, but still be able to address a large number of slave devices.

To alleviate the need for a large number of RFFE USIDs, a group of single wire serial bus interface (SuBUS) slaves are assigned the same USID. When a command is written using this USID, then all SuBUS slaves within the group listen to the command, but only the SuBUS slaves that match the address of the register map address sent in the command respond to the command.

Figure 1:
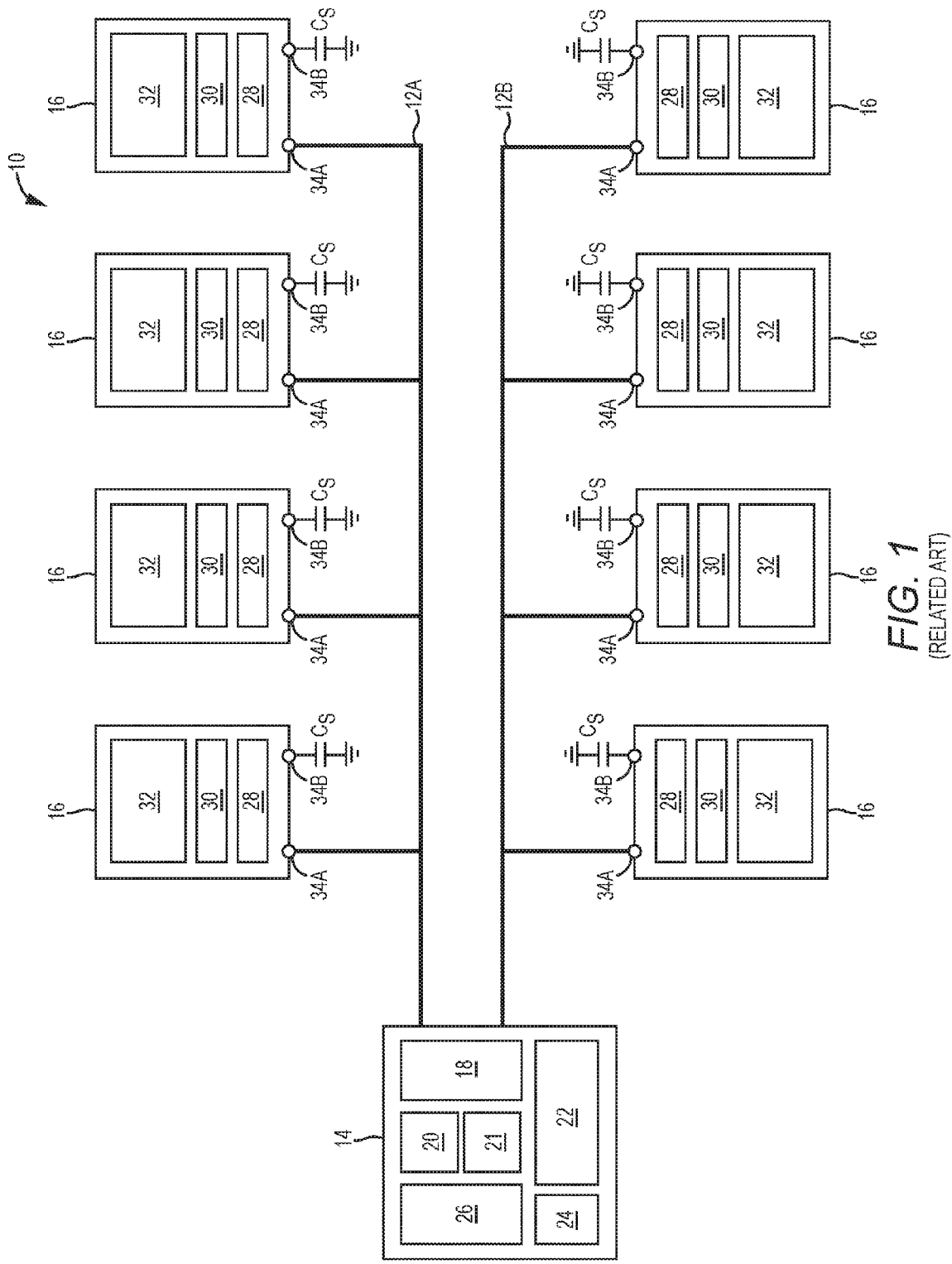
FIG. 1 is a functional schematic illustrating a conventional single wire communications system.

The present disclosure relates to a method in which each USID allocated from the RFFE bus can be used to address many SuBUS slaves and thereby help to alleviate the problem of the finite RFFE USID address space. In particular, by using the systems, devices, and methods disclosed in the present disclosure, a group of slave devices on a single wire communications bus can be controlled using a reduced number of unique identifiers. This allows for communication for a group of slave devices on a single wire communications bus to be controlled by using a unique identifier to address many slave devices, thereby alleviating the problem of finite identifiers and address space. A group of slave devices on a single wire communications bus can be assigned the same identifier, and the identifier and a register map address sent in a message on the single wire communications bus can be used to address the appropriate slave device. Only the slave device(s) that are associated with a register map address that matches the register map address in the message will respond to any command in the sent message. Before discussing the systems, devices, and methods disclosed in the present disclosure, a conventional single wire communication bus system is discussed. FIG. 1 illustrates a conventional single wire communications system 10. The conventional single wire communications system 10 includes a first single wire communications bus 12A and a second single wire communications bus 12B. A master controller 14 (also known as a bridge bus controller) is coupled to each one of the first single wire communications bus 12A and the second single wire communications bus 12B. A number of slave devices 16 are each coupled to one of the first single wire communications bus 12A and the second single wire communications bus 12B.

The master controller 14 includes communications circuitry 18, a first-in-first-out (FIFO) buffer 20, a digitally controlled oscillator 22, power management circuitry 24, and secondary communications circuitry 26. The communications circuitry 18 is configured to interface with the first single wire communications bus 12A and the second single wire communications bus 12B in order to facilitate communication with the slave devices 16. The FIFO buffer 20 is used to store and access data required for communication on the first single wire communications bus 12A and the second single wire communications bus 12B. The FIFO buffer 20 acts as a buffer for the RFFE (secondary communication bus) commands, as RFFE may be faster than SuBUS. The master controller 14 may also include a memory 21, which may be an image memory in one embodiment. In one embodiment, the memory 21 is used for storing data received in a communication sequence, and/or data sent to or from the slave devices 16. In one embodiment, the memory 21 may be an image memory configured to store an image of all slave devices on the SuBUS so that an RFFE read can occur in what appears to be real time. The digitally controlled oscillator 22 is used to generate signals for communicating on the first single wire communications bus 12A and the second single wire communications bus 12B. The power management circuitry 24 is responsible for meeting the required power needs of the other circuitry in the master controller 14. The secondary communications circuitry 26 is configured to communicate with one or more other devices on a different type of communication bus, thereby enabling the slave devices 16 to communicate with devices that are not on the first single wire communications bus 12A and the second single wire communications bus 12B.

Each one of the slave devices 16 includes power management circuitry 28, communications circuitry 30, functional circuitry 32, a first pin 34A, and a second pin 34B. The power management circuitry 28 is responsible for meeting the required power needs of the other circuitry in the slave device 16. The communications circuitry 30 is configured to facilitate communications on the single wire communications bus 12. The functional circuitry 32 is configured to perform some function, which may be regulated or otherwise controlled by communication over the single wire communications bus 12. The first pin 34A is used to connect the slave device 16 to the single wire communications bus 12. The second pin 34B is used to connect the slave device 16 to ground via a power management capacitor $C_S$.

Each one of the slave devices 16 must be uniquely identified on the single wire communications bus 12 to which they are attached. Conventionally, this has been done by a hard-coded unique slave identifier (USID) which is set for the slave device during manufacturing. So long as each one of the slave devices 16 has a different USID, the master controller 14 can uniquely address each one of the slave devices 16 and thus properly communicate therewith. The USID may be limited in size (e.g., 4 bits), thereby setting an upper limit to the number of slave devices 16 that can be present on a single wire communications bus 12 while remaining uniquely identifiable (e.g., 15 devices for a 4 bit USID). Accordingly, multiple single wire communications busses 12 may be provided as in the first single wire communications bus 12A and the second single wire communications bus 12B to accommodate a desired number of slave devices 16.

Figure 2:
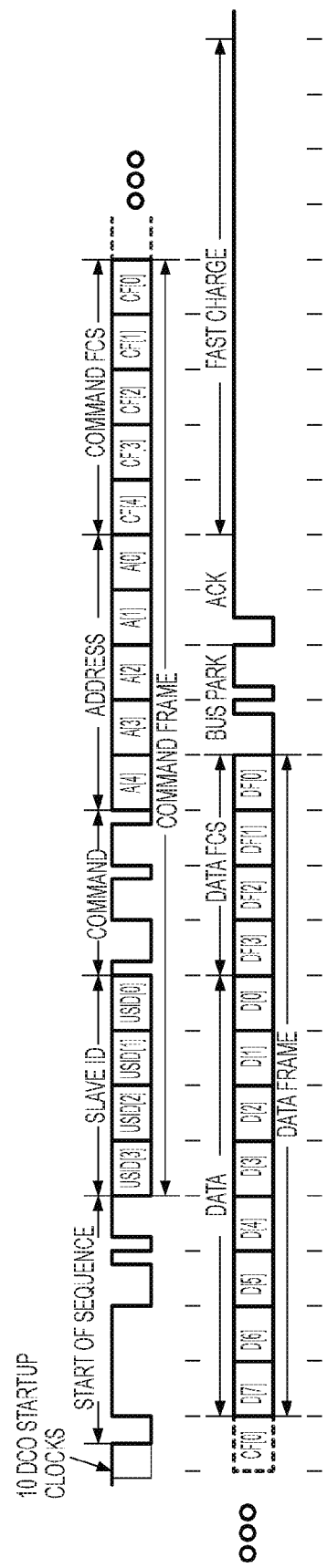
FIG. 2 is a diagram illustrating an exemplary message for a write command sequence in a single wire communications system.

FIG. 2 is a waveform illustrating an exemplary communication sequence on the first single wire communications bus 12A and the second single wire communications bus 12B. FIG. 2 illustrates an exemplary message for a write command sequence in a single wire communications system. Although FIG. 2 presents a SUBUS command sequence, an RFFE command sequence uses the same structure for slave ID, address, and data, albeit in a level-sensitive form as opposed to pulse-width modulation (PWM), as shown in FIG. 2 for the SuBUS system.

The message begins with a start of sequence, followed by a command frame including a USID, a command, an address, and a command frame check sequence, followed by a data frame including data and a data frame check sequence, followed by a bus park, followed by an acknowledgement, followed by a fast charge. The start of sequence indicates the beginning of a message on the single wire communications bus. The slave ID or USID field is sent first to identify a particular slave or in this case the group of slaves in question. Next, a command field is sent to identify whether the command is a read command or a write command, for example. The command frame indicates the function of the message, where the USID indicates the slave device 16 for which the message is intended. The command indicates what the slave device 16 should do in response to the message (i.e., read data from memory, write data to memory).

After this, a register map address sent. As discussed herein, a register map is an addressable memory space within a memory of a slave device 16, and a register map address is a specific location within the addressable memory space. The address indicates which memory location within an addressable memory space is acted upon in a slave device 16 by the message. This address within the register map may be used in the system disclosed herein by the group of SuBUS slaves with a common USID to determine whether the data sent in the data frame will be acted upon by the SuBUS slaves, i.e., whether the data will be stored or sent by one or more of the SuBUS slaves.

The command frame check sequence is used to verify the contents of the command frame. The data frame provides the actual data for the message, which is acted on according to the command provided in the command frame, while the data frame check sequence is used to verify the contents of the data frame. The remaining portions of the waveform signify the end of the message.

As shown above, the USID is only four bits long. This means that only fifteen different slave devices 16 may be included on a single wire communications bus 12 if they are uniquely identified by USID alone. To increase the number of slave devices 16 that may be included on a single wire communications bus 12, different part numbers may be used along with the USID to uniquely identify different slave devices 16. Further, a number of registers in memory of each one of the slave devices 16 may be reserved for further identification of slave devices 16 on the first single wire communications bus 12A and the second single wire communications bus 12B.

Figure 3:
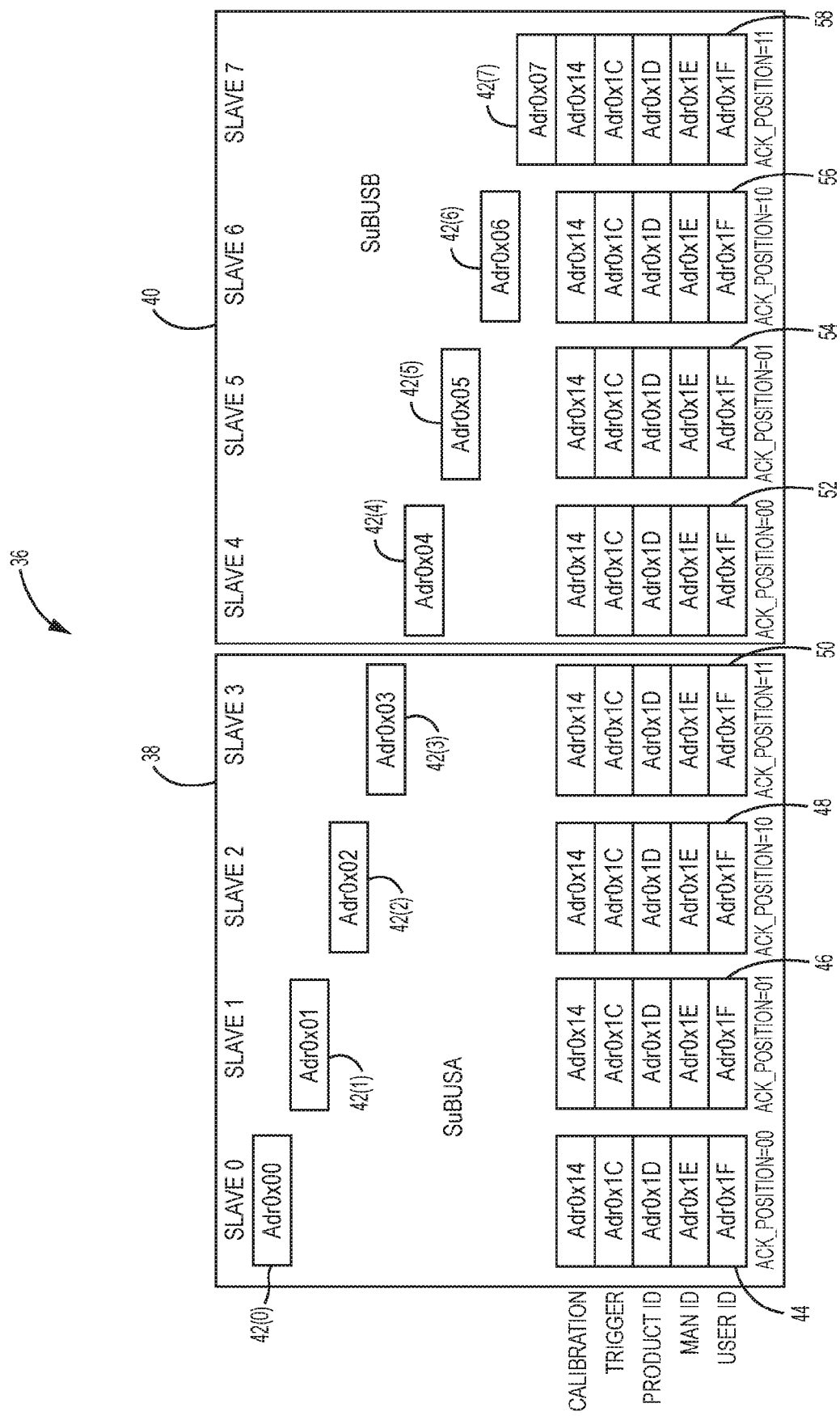
FIG. 3 is a diagram illustrating an exemplary register address map for a single wire communications system according to one embodiment of the present disclosure.

To illustrate, FIG. 3 is a diagram illustrating an exemplary register address map 36 for a single wire communications system according to one embodiment of the present disclosure. FIG. 3 is a chart showing register map(s) for the slave devices 16. A first group of register addresses 38 is for slaves 0-3, which in one embodiment may be connected to a first single bus communications bus SuBUS A, such as single bus communications bus 12A in FIG. 1. A second group of register addresses 40 is for slaves 4-7, which in one embodiment may be connected to a second single bus communications bus SuBUS B, such as single bus communications bus 12B in FIG. 1.

A first subset of registers in each one of the slave devices 16 is reserved for device identification, while a second subset of registers are shared registers. Each one of the slave devices 16 is associated with a different one (or, while not shown, multiple ones) of the first subset of registers, which is illustrated by the subset of registers 42(0), 42(1), 42(2), 42(3), 42(4), 42(5), 42(6), and 42(7). This means that the slave device 16 will only respond to messages on the single wire communications bus 12 that access (e.g., read from or write to) this register address by including it in the address field of the command frame. Since each one of the slave devices 16 is associated with only one of the first subset of registers 42(0)-42(7), respectively, this provides an additional way to uniquely identify and thus communicate with the slave device 16 without changing a USID thereof. That is, all of the slave devices 16 may have the same USID but respond to a different one of the first subset of registers 42(0)-42(7). The number of registers in the first subset of registers 42(0)-42(7) determines the total number of uniquely addressable slave devices 16 on a single wire communications bus 12 (multiplied by the number of unique USIDs). The second subset of registers, which includes registers 44, 46, 48, 50, 52, 54, 56, and 58, may be shared across the slave devices 16 meaning that the contents of these registers may be synchronized across the slave devices 16. These shared registers may include calibration data, trigger data, product IDs, user IDs, and the like.

In essence, FIG. 3 illustrates using a number of registers in a slave device 16 as a sub-address to the USID, thereby expanding the length of the unique identifier for each slave device 16. By using registers in each one of the slave devices 16 to uniquely identify the slave devices 16 on the single wire communications bus 12, the number of slave devices 16 that may be included on the single wire communications bus 12 may drastically increase. The cost in usable register space in each one of the slave devices 16 is generally negligible. Similar to the USID, determining which one of the registers in the first subset of registers 42 a slave device 16 is associated with may be hard-coded during manufacturing.

Referring back to FIG. 3, the register address map 36 is shown for a system of eight SuBUS slaves that share a common USID but respond to different register map addresses. Certain registers are read/write registers, and other registers are write-only registers. For example, in one embodiment, registers 42(0)-42(7), 44, and 52 may be read/write registers, while the remaining registers are write-only registers. Note in this example that there are eight SuBUS slaves with the same USID that are split between two SuBUS ports, SuBUS A 38 and SuBUS B 40. Thus, Slave 4 serves a similar purpose as Slave 0 for common register read functions, but for the SuBUSB 40 port.

Figure 4:
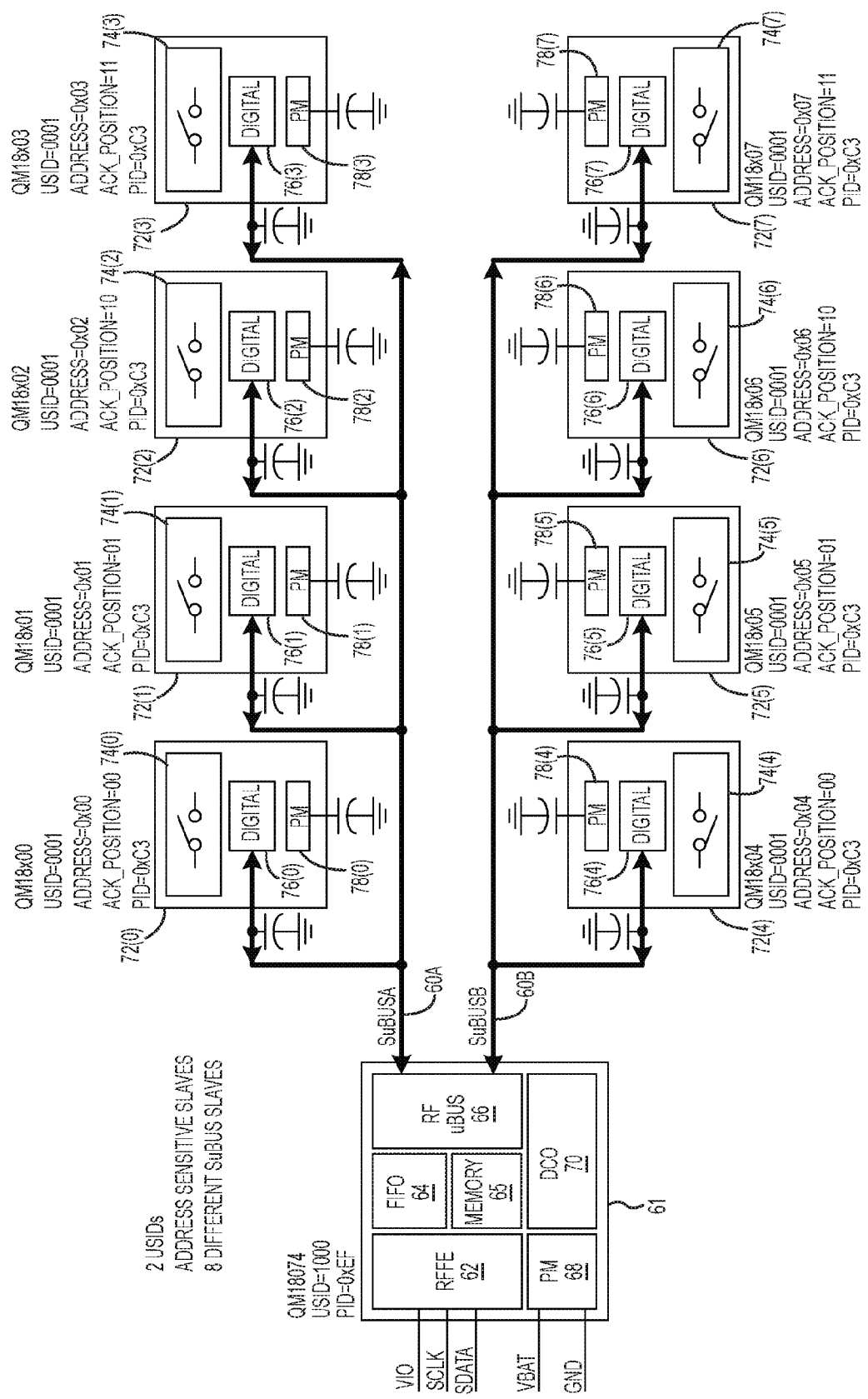
FIG. 4 is a functional schematic illustrating a single wire communications system including a group of slave devices according to one embodiment of the present disclosure.

A block diagram of this system is shown in FIG. 4. FIG. 4 illustrates a single wire communications system according to one embodiment of the present disclosure. In the system of FIG. 4, each SuBUS slave must be unique, and thus there are eight SuBUS slave parts. In this system, eight SuBUS slaves are controlled with only two USIDs, one identifier for a bridge bus controller (also known as a SuBUS bridge) and one slave identifier common to all eight of the SuBUS slaves. Note that although FIG. 4 shows eight SuBUS slaves, there may be a different number of SuBUS slaves in other embodiments. For example, in one embodiment, there could be twelve (12) SuBUS slaves, with three (3) SuBUS ports.

The single wire communications system includes a first single wire communications bus 60A and a second single wire communications bus 60B. A master controller 61, which may be referred to as a bridge bus controller, is coupled to each one of the first single wire communications bus 60A and the second single wire communications bus 60B.

The master controller 61 includes RFFE communications circuitry 62, a first-in-first-out (FIFO) buffer 64, communications circuitry 66, power management circuitry 68, and a digitally controlled oscillator 70. A number of slave devices 72(0)-72(7) are each coupled to one of the first single wire communications bus 60A and the second single wire communications bus 60B. The RFFE communications circuitry 62 is configured to communicate with one or more other devices on a different type of communication bus, thereby enabling the slave devices 72(0)-72(7) to communicate with devices that are not on the first single wire communications bus 60A and the second single wire communications bus 60B. For example, the RFFE communications circuitry 62 may allow the master controller 61 and thus the slave devices 72(0)-72(7) to communicate with one or more other devices on an RFFE communications bus. In one embodiment, the master controller 61 may be a bridge bus controller configured to translate one or more commands in the command field formatted according to a first bus protocol, such as an RFFE protocol, to a single wire communications bus protocol. For more details on how a bridge bus controller configured to translate one or more commands in the command field from a first bus protocol, such as an RFFE protocol to a single wire communications bus protocol, see U.S. patent application Ser. No. 14/659,328, filed Mar. 16, 2015, now U.S. Pat. No. 10,282,269, entitled "READ TECHNIQUE FOR A BUS INTERFACE SYSTEM," and U.S. patent application Ser. No. 14/659,371, filed Mar. 16, 2015, entitled "POWER MANAGEMENT SYSTEM FOR A BUS INTERFACE SYSTEM," which are both incorporated by reference in their entireties.

The FIFO buffer 64 is used to store and access data required for communication on the first single wire communications bus 60A and the second single wire communications bus 60B. The master controller 61 may also include a memory 65, which may be an image memory in one embodiment. In one embodiment, the memory 65 is used for storing data received in a communication sequence, and/or data sent to or from the slave devices 72(0)-72(7). In one embodiment, the memory 65 may be an image memory configured to store an image of all slave devices on the SuBUS so that an RFFE read can occur in what appears to be real time. The communications circuitry 66 is configured to interface with the first single wire communications bus 60A and the second single wire communications bus 60B in order to facilitate communication with the slave devices 72(0)-72(7). The power management circuitry 68 is responsible for meeting the required power needs of the other circuitry in the master controller 61. The digitally controlled oscillator 70 is used to generate signals for communicating on the first single wire communications bus 60A and the second single wire communications bus 60B.

Each one of the slave devices 72(0)-72(7) includes functional circuitry 74, communications circuitry 76, and power management circuitry 78. The functional circuitry 74(0)-74(7) is configured to perform some function, which may be regulated or otherwise controlled by communication over the single wire communications bus 60A or 60B, for each of the respective slave devices 72(0)-72(7). In one exemplary embodiment, the functional circuitry 74(0)-74(7) may include a radio frequency (RF) switch that may be opened and/or closed in response to commands on the single wire communications bus 60A or 60B. The communications circuitry 76(0)-76(7) is configured to facilitate communications on the single wire communications bus 60A or 60B for each of the respective slave devices 72(0)-72(7). The power management circuitry 78(0)-78(7) is responsible for meeting the required power needs of the other circuitry for each of the respective slave devices 72(0)-72(7).

The communications system of FIG. 4 can be used to handle communication for a group of slave devices on a single wire communications bus having the same slave identifier. The single wire communications bus 60A or 60B is configured to receive a message comprising data, a slave identifier, and a register map address, such as the message in FIG. 2. A respective one of the plurality of slave devices 72(0)-72(7) responds to the message only if the register map address in the message is the same as a register map address associated with the respective one of the plurality of slave devices. Only the particular slave device(s) of the plurality of slave devices 72(0)-72(7) that match the register map address will respond to any command in the sent message.

As mentioned above, the command indicates what the slave device 72 should do in response to the message (i.e., read data from memory, write data to memory). For write commands this is straightforward; each slave responds to one or more registers as applies to that SuBUS slave. Many slaves can respond to the same register writer without conflict.

For read commands, the group of slave devices must ensure that data sent back during the data frame of a read command sequence comes from only one slave at a time. This is again straightforward if the user registers between each slave of the group are unique, since a read from one of these registers only responds from that register and that register only exists in one slave of the group.

However, there are several registers that are common to every slave, and thus precautions have to be taken to properly deal with read commands from these registers. One of the slaves of the group sends data back during a read data frame if a read is made from one of the shared register locations. This is called "Slave 0" in this example. All other slaves in the group do not send data back during the data frame of a read command sequence made to one of these common registers.

Thus, the data written to common registers in slaves other than Slave 0 cannot be directly read back using a SuBUS read command. However, in the SuBUS system, it is not necessary to actually read back the data from these registers, because in the SuBUS system, whenever a write command sequence is properly received, then the SuBUS slave replies with an acknowledgment (ACK) to signify proper reception. For a write command to more than one slave (broadcast write command), each slave on each SuBUS port responds in a "Round Robin ACK" so that proper reception of the data is verified by each SuBUS slave. Thus all common registers are written using broadcast commands, and the common registers are broadcast-enabled within the group of SuBUS slaves.

When the bridge bus controller receives an acknowledgment, then the data that was written to the SuBUS slave is transferred to the bridge image memory for that slave. If the RFFE master desires to read the data from one of the SuBUS slaves, it actually reads the data from this memory since the SuBUS data from a slave can never be available real-time for RFFE. In one embodiment, the bridge bus controller may be configured to provide data stored in the memory in a data frame of a read command sequence of the first bus protocol.

Figure 5:
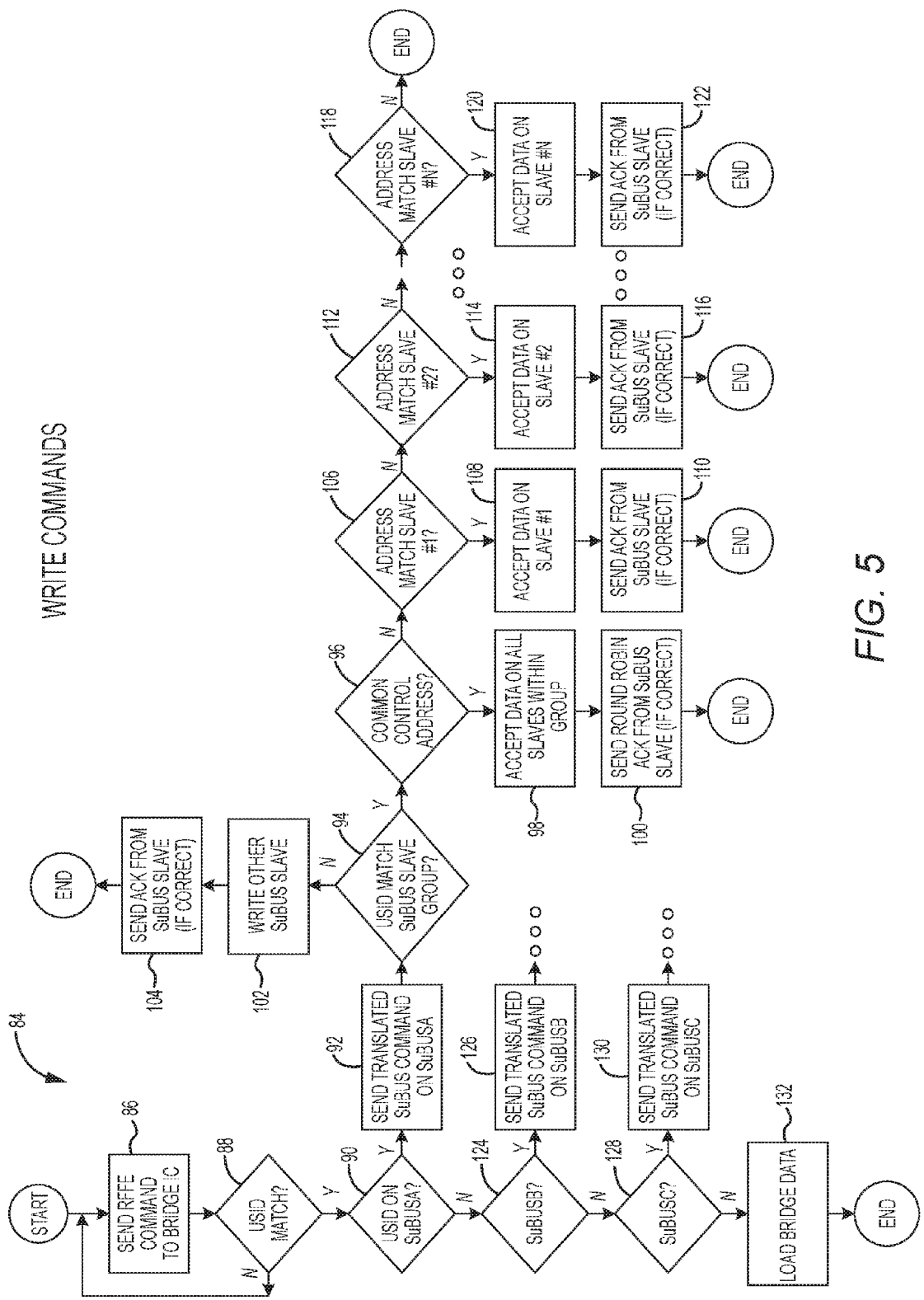
FIG. 5 is a flowchart showing an exemplary write command sequence according to one embodiment of the present disclosure.

FIG. 5 is a flowchart showing an exemplary write command sequence according to one embodiment of the present disclosure. The write command sequence 84 begins when a RFFE command is sent to the bridge bus controller (such as master controller 61 in FIG. 4) (step 86). The bridge bus controller checks to see if the USID in the command is a match for any of the slave devices or the bridge (step 88), and if not, the bridge bus controller waits for another RFFE command. If the USID is a match, then the bridge bus controller checks to see if the USID matches a first single wire communication bus (such as first single wire communications bus 12A, FIG. 1) (step 90). If so, the bridge bus controller translates the RFFE command to a SuBUS command and sends it on the first single wire communication bus (step 92). As discussed above, both SuBUS and RFFE commands include data, a USID, and a register map address. Each slave device then checks the USID included in the SuBUS command to see if it matches its own USID (step 94) and if so, checks to see if the SuBUS command acts on a common control address, i.e., checks to see if the SuBUS command is a broadcast command to a common register shared for all the slave devices in the group (step 96). If the USID does not match any of the plurality of slave devices on the first single wire communications bus, then the write command goes to the other SuBUS slave (step 102) and an acknowledgement is sent from the other SuBUS slave (step 104).

If the USID matches one or more of a plurality of slave devices on the first single wire communications bus, and there is a common control address, i.e., it is a broadcast command to a common register shared for all the slave devices in the group, the data in the write command sequence is written to the memory location specified by the register map address for all slave devices within the group (step 98). A round robin acknowledgement is sent from each of the slave devices within the group in step 100 if correct, as discussed above, and the write command sequence ends.

Going back to step 96, if it is not a common control address, i.e., it is a command to a non-shared register and thus not meant for all the slave devices in the group, then the register address in the message is checked to see if it matches a register address for a first slave device (slave 1) in the group (step 106). If so, the data in the write command sequence can be written to the memory location specified by the register map address for slave device 1 (step 108), and an acknowledgement is sent from slave device 1 to the bridge bus controller (step 110), if correct, as discussed above, and the write command sequence ends. If the register address in the message does not match a register address for a first slave device (slave 1), then it is checked for each of the other slaves in the group, and the data is written to the memory location specified by the register map address by the slave device(s) that has a register map address that matches or is associated with the register address in the message (steps 112-122).

Going back to step 90, if the USID does not match a first single wire communication bus, then the bridge bus controller checks to see if the USID matches a second single wire communication bus (such as second single wire communications bus 12B, FIG. 1) (step 124). If so, the bridge bus controller translates the RFFE command to a SuBUS command and sends it on the second single wire communication bus (step 126), and then a process similar to steps 94-122 would be done for the second single wire communication bus. If the USID does not match the second single wire communication bus, the bridge bus controller checks to see if the USID matches a third single wire communication bus (step 128). If so, the bridge bus controller translates the RFFE command to a SuBUS command and sends it on the third single wire communication bus (step 130), and then a process similar to steps 94-122 would be done for the third single wire communication bus. If the USID does not match any of the groups of slave devices, it is loaded as bridge data into the bridge bus controller (step 132).

Figure 6:
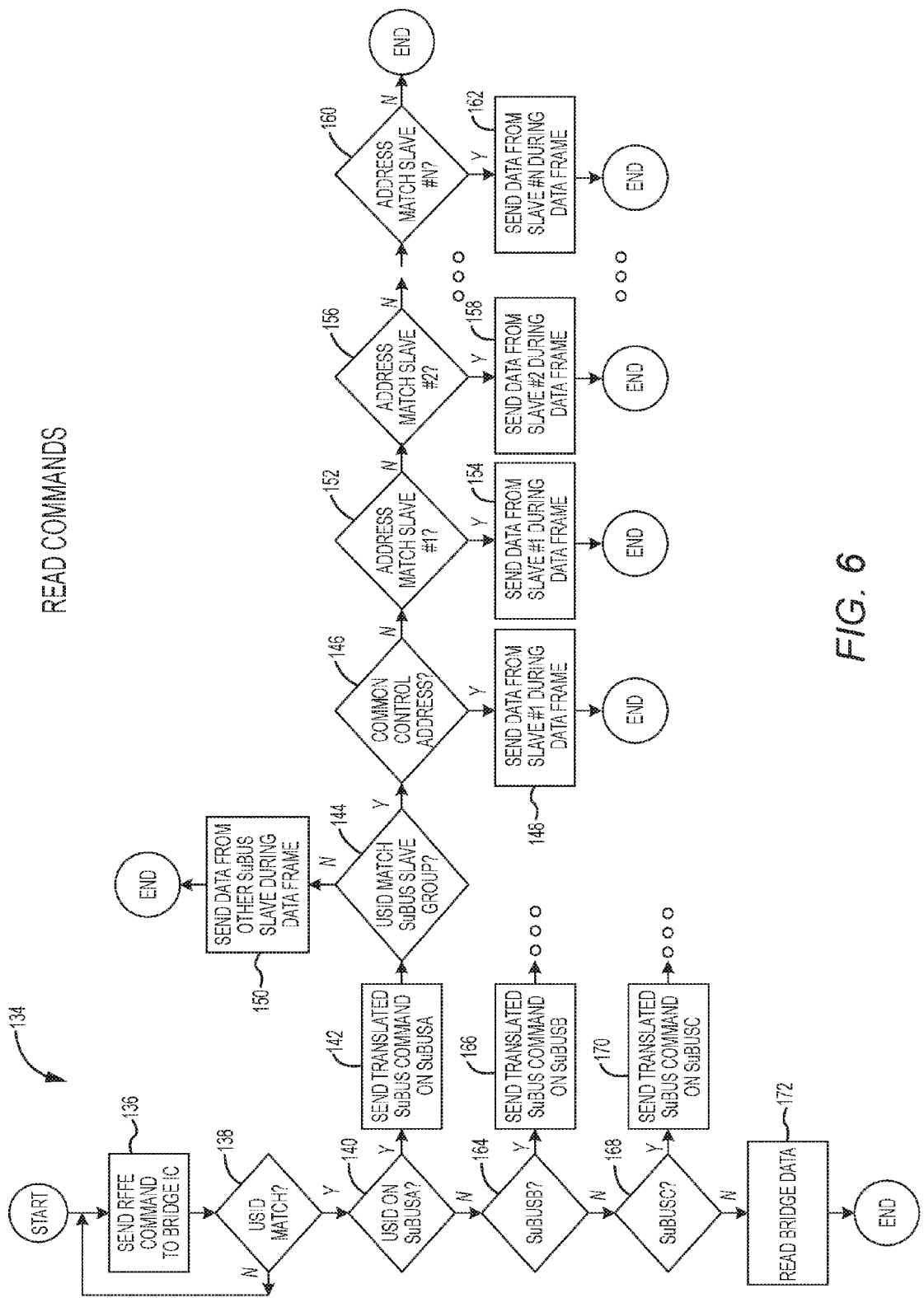
FIG. 6 is a flowchart showing an exemplary read command sequence according to one embodiment of the present disclosure.

FIG. 6 is a flowchart showing an exemplary read command sequence according to one embodiment of the present disclosure. The read command sequence 134 begins when a RFFE command is send to the bridge bus controller (such as master controller 61 in FIG. 4) (step 136). The bridge bus controller checks to see if the USID in the command is a match for any of the slave devices or the bridge (step 138), and if not, the bridge bus controller waits for another RFFE command. If the USID is a match, then the bridge bus controller checks to see if the USID matches a first single wire communication bus (such as first single wire communications bus 12A, FIG. 1) (step 140). If so, the bridge bus controller translates the RFFE command to a SuBUS command and sends it on the first single wire communication bus (step 142). As discussed above, both SuBUS and RFFE commands include data, a USID, and a register map address. Each slave device then checks the USID included in the SuBUS command to see if it matches its own USID (step 144) and if so, checks to see if the SuBUS command acts on a common control address, i.e., checks to see if the SuBUS command is a broadcast command to a common register shared for all the slave devices in the group (step 146). If the USID does not match any of the plurality of slave devices on the first single wire communications bus, then the data in the message is sent to the other SuBUS slave during a data frame (step 150).

If the USID matches one or more of a plurality of slave devices on the first single wire communications bus, and there is a common control address, then data stored at the location indicated by the register map address is sent from a first slave (slave 1) during the data frame (step 148). In one embodiment, the bridge bus controller may be configured to provide data stored in the memory in a data frame of a read command sequence of the first bus protocol, such as RFFE.

If there is not a common control address, then the register address in the message is checked to see if it matches a register address for a first slave device (slave 1) in the group (step 152). If so, data stored at the location indicated by the register map address can be sent from slave device 1 (step 154). If the register address in the message does not match a register address for a first slave device (slave 1), then it is checked for each of the other slaves in the group (steps 156 and 160), and if the register map address in the message matches a register address for a particular slave device, then that slave device will send data during the data frame (steps 158, 162).

Going back to step 140, if the USID does not match a first single wire communication bus, then the bridge bus controller checks to see if the USID matches a second single wire communication bus (such as second single wire communications bus 12B, FIG. 1) (step 164). If so, the bridge bus controller translates the RFFE command to a SuBUS command and sends it on the second single wire communication bus (step 166), and then a process similar to steps 144-162 would be done for the second single wire communication bus. If the USID does not match the second single wire communication bus, the bridge bus controller checks to see if the USID matches a third single wire communication bus (step 168). If so, the bridge bus controller translates the RFFE command to a SuBUS command and sends it on the third single wire communication bus (step 170), and then a process similar to steps 144-162 would be done for the third single wire communication bus. If the USID does not match any of the groups of slave devices, it is read as bridge data into the bridge bus controller (step 172).

Referring back to FIG. 4, each SuBUS slave in that embodiment must be unique, and thus there are eight SuBUS slave parts. In the system of FIG. 4, eight SuBUS slaves are controlled with only two USIDs, one for a bridge bus controller (also known as a SuBUS bridge) and one for all eight of the SuBUS slaves.

Referring back to FIG. 1, slave devices 16 that are otherwise identical (e.g., by providing the same functional circuitry 32) must be provided as different physical parts to achieve the different USIDs and/or different associated register map addresses. Accordingly, if eight slave devices 16 are needed in a system, eight different slave device 16 parts are needed. These eight different slave device 16 parts must be separately manufactured, inventoried, and installed, which is undesirable from both a supplier and a customer standpoint.

Figure 7:
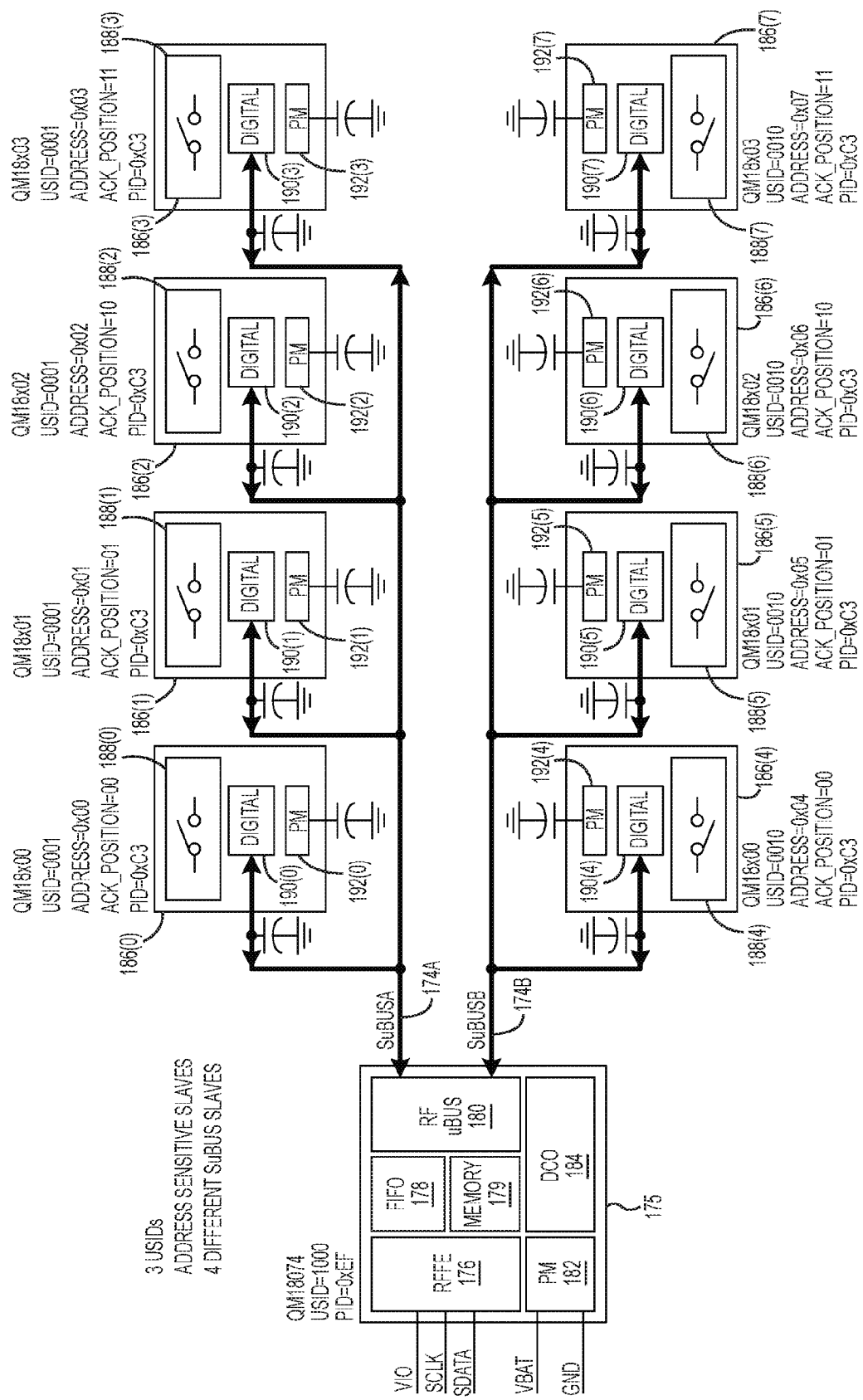
FIG. 7 is a functional schematic illustrating a single wire communications system including a group of slave devices according to an alternate embodiment of the present disclosure.

To avoid using as many different slave device parts, an alternate embodiment may be used. FIG. 7 is a functional schematic illustrating a single wire communications system including a group of slave devices according to an alternate embodiment of the present disclosure.

The single wire communications system of FIG. 7 includes a first single wire communications bus 174A and a second single wire communications bus 174B. A master controller 175 is coupled to each one of the first single wire communications bus 174A and the second single wire communications bus 174B.

The master controller 175 includes RFFE communications circuitry 176, a first-in-first-out (FIFO) buffer 178, communications circuitry 180, power management circuitry 182, and a digitally controlled oscillator 184. A number of slave devices 186(0)-186(7) are each coupled to one of the first single wire communications bus 174A and the second single wire communications bus 174B.

The RFFE communications circuitry 176 is configured to communicate with one or more other devices on a different type of communication bus, thereby enabling the slave devices 186(0)-186(7) to communicate with devices that are not on the first single wire communications bus 174A and the second single wire communications bus 174B. For example, the RFFE communications circuitry 176 may allow the master controller 175 and thus the slave devices 186(0)-186(7) to communicate with one or more other devices on an RFFE communications bus. The FIFO buffer 178 is used to store and access data required for communication on the first single wire communications bus 174A and the second single wire communications bus 174B. The master controller 175 may also include a memory 179, which may be an image memory in one embodiment. In one embodiment, the memory 179 is used for storing data received in a communication sequence, and/or data sent to or from the slave devices 186(0)-186(7). In one embodiment, the memory 179 may be an image memory configured to store an image of all slave devices on the SuBUS so that an RFFE read can occur in what appears to be real time. The communications circuitry 180 is configured to interface with the first single wire communications bus 174A and the second single wire communications bus 174B in order to facilitate communication with the slave devices 186(0)-186(7). The power management circuitry 182 is responsible for meeting the required power needs of the other circuitry in the master controller 175. The digitally controlled oscillator 184 is used to generate signals for communicating on the first single wire communications bus 174A and the second single wire communications bus 174B.

Each one of the slave devices 186(0)-186(7) includes functional circuitry 188, communications circuitry 190, and power management circuitry 192. The functional circuitry 188(0)-188(7) is configured to perform some function, which may be regulated or otherwise controlled by communication over the single wire communications bus 174A or 174B, for each of the respective slave devices 186(0)-186(7). In one exemplary embodiment, the functional circuitry 188(0)-188(7) may include a radio frequency (RF) switch that may be opened and/or closed in response to commands on the single wire communications bus 174A or 174B. The communications circuitry 190(0)-190(7) is configured to facilitate communications on the single wire communications bus 174A or 174B for each of the respective slave devices 186(0)-186(7). The power management circuitry 192(0)-192(7) is responsible for meeting the required power needs of the other circuitry for each of the respective slave devices 186(0)-186(7).

In the alternate embodiment of FIG. 7, there are only four (4) unique SuBUS slave parts. In the system of FIG. 7, the four SuBUS slaves are controlled with three USIDs, one for a bridge bus controller (also known as a SuBUS bridge) and two slave identifiers common to the four SuBUS slaves. Note that although FIG. 7 shows four SuBUS slaves, any number of different number of SuBUS slaves and any number of different associated slave identifiers may be used in other embodiments, depending on whether more or less unique slave parts are desired, or more or less different slave identifiers are desired to be used. For example, there could be two unique SuBUS slaves, each associated with three slave identifiers, which would be like having six different SuBUS slaves.

Referring back to FIG. 7, note that there are two groups each of four SuBUS slaves with the same USID. For example, in the embodiment of FIG. 7, slave devices 186(0)-186(3) share a first common slave identifier USID 0001 and slave devices 186(4)-186(7) share a second common slave identifier 0010. However, the four slaves that make up each group are repeated for each group, one for each USID. Each of the SuBUS slaves can respond to two different USIDs: USIDA and USIDB, for example. When a command sequence is written using a first common slave identifier (USIDA), then the SuBUS slave responds to a first register map address (or addresses). When a command sequence is written using a second common slave identifier (USIDB), then the same SuBUS slave responds to a second register map address (or addresses). In such a fashion, each SuBUS slave 186(0)-186(7) can be used twice, once on SuBUS Port A and again on SuBUS Port B. The bridge bus controller then routes the RFFE commands to the proper port so that the SuBUS slave on each port only sees one of the two command sequences with different USIDs.

Figure 8:
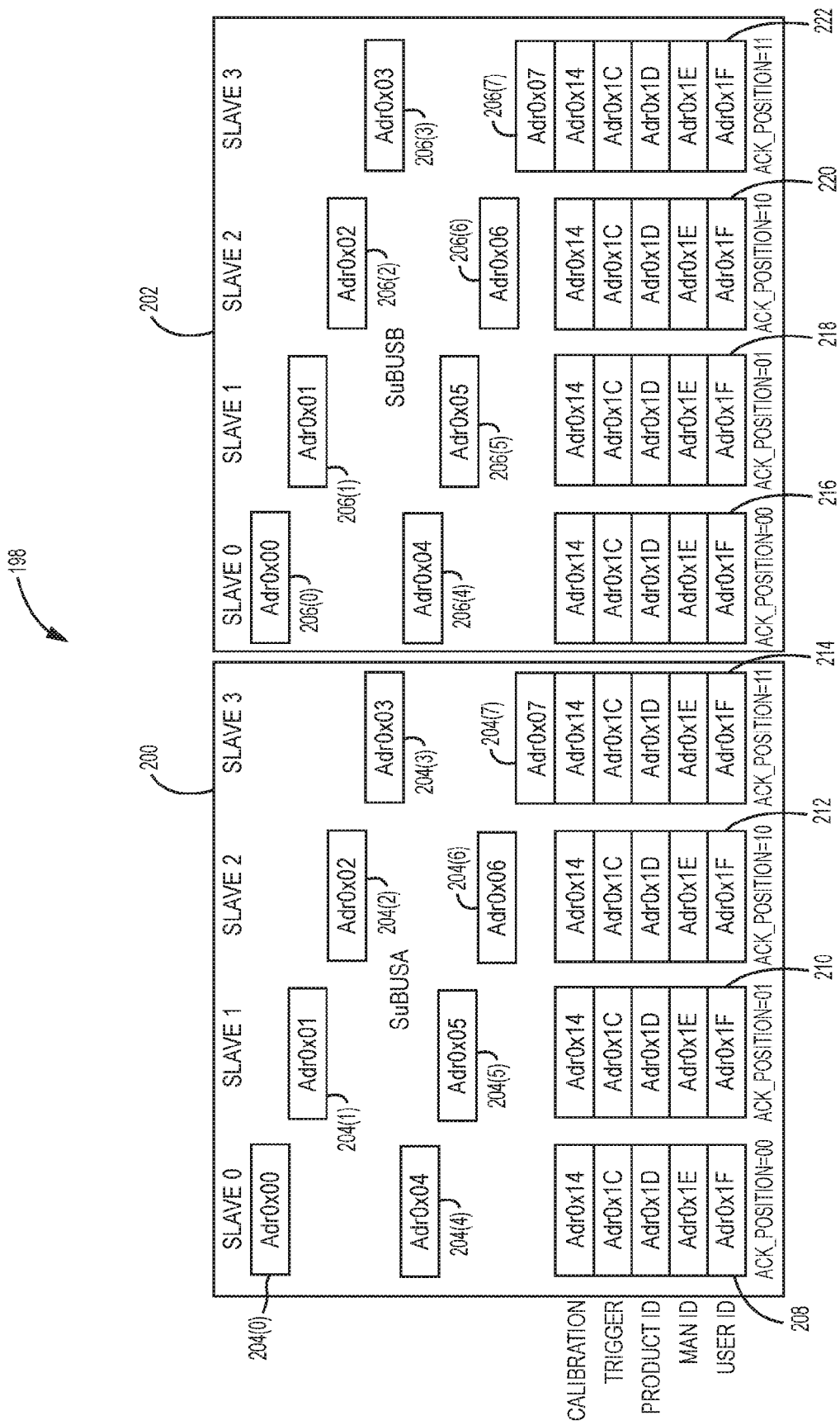
FIG. 8 is a diagram illustrating an exemplary register address map for the exemplary single wire communications system of FIG. 7.

FIG. 8 presents an exemplary register map 198 of the alternative embodiment shown in FIG. 7. Registers 204(0)-204(7), 206(0)-206(7), 208, and 216 are read/write registers, while registers 210, 212, 214, 218, 220, and 222 are write-only registers. Note that in this example there are two groups each of four SuBUS slaves with the same USID. However, the four slaves that make up each group are repeated for each group.

FIG. 8 is a chart showing alternative register maps for the slave devices 186(0)-186(7). The register maps are similar to those shown above in FIG. 3, except that each slave device 186 is associated with two different ones (or, while not shown, multiple ones) of a first subset of registers 204(0)-204(7), and two different ones (or, while not shown, multiple ones) of a second subset of registers 206(0)-206(7), depending on which SuBUS port the slave device is being used. Thus, for example, if the slave identifier for SuBUS A 200 is used, slave 0 is associated with registers 204(0) and 204(4); slave 1 is associated with registers 204(1) and 204(5); slave 2 is associated with registers 204(2) and 204(6); and slave 3 is associated with registers 204(3) and 204(7). Thus, for example, if the slave identifier for SuBUS B 202 is used, slave 0 is associated with registers 206(0) and 206(4); slave 1 is associated with registers 206(1) and 206(5); slave 2 is associated with registers 206(2) and 206(6); and slave 3 is associated with registers 206(3) and 206(7).

In this case, each one of the slave devices 186 may respond to two USIDs, and may use the first one of the first subset of registers when addressed using the first USID and the second one of the first subset of registers when addressed using the second USID. That is, if a slave device 186 is addressed using a first USID it may respond only to those messages that access the first register address, while if the slave device 186 is addressed using the second USID it may respond only to those messages that access the second register address. Using the register maps in FIG. 8 effectively doubles the number of times the same slave device 186 part can be used on the single wire communications bus 174. Note that this embodiment requires one additional USID but reduces the number of unique parts by 50%, or from eight (8) slave devices to four (4) slave devices. Thus, with two SuBUS ports, the number of physical SuBUS slave devices can be reduced by a factor of two.

The systems, devices, and methods disclosed herein help to alleviate the need for a large number of USIDs by assigning a group of SuBUS slaves the same slave identifier and using a register map address in a slave addressing scheme. The present disclosure relates to a method in which each USID allocated from the RFFE bus can be used to address many SuBUS slaves and thereby help to alleviate the problem of the finite RFFE USID address space. This allows for communication for a group of slave devices on a single wire communications bus to be controlled by using an unique identifier to address many slave devices, thereby alleviating the problem of finite identifiers and address space. A group of slave devices on a single wire communications bus can be assigned the same identifier, and the identifier and a register map address sent in a message on the single wire communications bus can be used to address the appropriate slave device. Only the slave device(s) that are associated with a register map address that matches the register map address in the message will respond to any command in the sent message. When a command is written using this USID, then all SuBUS slaves within the group listen to the command, but only the SuBUS slaves that match the sent address of the register map field respond to the command.

The present disclosure provides for, but is not limited to, the following: a system of SuBUS slaves that all have a common USID but are differentiated by responses based on at least one address of a register map; wherein data written in a write command sequence to the SuBUS is seen by all SuBUS slaves but only used if the address of the register map in a message matches a register map address associated with the particular SuBUS slave; wherein a SuBUS bridge controller is used to translate RFFE-formatted commands to SuBUS-formatted commands; wherein the SuBUS bridge controller is used to receive an acknowledgment signal from each SuBUS slave for each write command sequence and store the data sent to the SuBUS slaves in an image memory within the SuBUS bridge controller for each SuBUS slave if the acknowledgment signal is valid, wherein only one of the SuBUS slaves transmits data during a SuBUS data frame of a SuBUS read command sequence, and this data is stored in the image memory of the SuBUS bridge controller, and wherein the SuBUS bridge controller uses data stored in the image memory of all SuBUS slaves to provide data during an RFFE data frame of an RFFE read command sequence.

Those skilled in the art will recognize improvements and modifications to the preferred embodiments of the present disclosure. All such improvements and modifications are considered within the scope of the concepts disclosed herein and the claims that follow.

What is claimed is:

1. A communications system comprising:
   a single wire communications bus; and
   a plurality of slave devices connected to the single wire communications bus, each of the plurality of slave devices associated with a first common slave identifier and a second common slave identifier;
   wherein the single wire communications bus is configured to receive a message comprising data, a slave identifier, and a register map address; and
   wherein a respective one of the plurality of slave devices selectively responds to the message when:
      the slave identifier in the message is the same as the first common slave identifier and the register map address in the message acts on a first register map address associated with the respective one of the plurality of slave devices; or
      the slave identifier in the message is the same as the second common slave identifier and the register map address in the message acts on a second register map address associated with the respective one of the plurality of slave devices.

2. The communications system of claim 1 wherein the message further comprises at least one command formatted according to a first bus protocol, and the system further comprising a bridge bus controller configured to translate the at least one command from the first bus protocol to a single wire communications bus protocol.

3. The communications system of claim 2 wherein the bridge bus controller is configured to:
   receive an acknowledgment signal from the respective one of the plurality of slave devices for a write command sequence; and
   store data sent to the respective one of the plurality of slave devices in a memory within the bridge bus controller for the respective one of the plurality of slave devices if the acknowledgement signal for the respective one of the plurality of slave devices is valid.

4. The communications system of claim 3 wherein only one of the plurality of slave devices is configured to transmit data during a data frame of a single wire communications bus read command sequence.

5. The communications system of claim 4 wherein the data transmitted by the only one of the plurality of slave devices is stored in the memory of the bridge bus controller.

6. The communications system of claim 5, wherein the bridge bus controller is configured to provide data stored in the memory in a data frame of a read command sequence of the first bus protocol.

7. The communications system of claim 2 wherein the plurality of slave devices comprises eight slave devices and the communications system is configured to control messages on the single wire communications bus for the eight slave devices using only two identifiers, a first identifier for the bridge bus controller and a second identifier for all eight slave devices.

8. The communications system of claim 1 wherein the plurality of slave devices comprises eight slave devices split between two ports such that there are four slave devices for each port.

9. The communications system of claim 1, wherein the plurality of slave devices comprises only four slave devices.

10. A slave device for use on a single wire communications bus, the slave device comprising:
    communications circuitry configured to communicate with one or more other slave devices via the single wire communications bus, wherein the slave device has a first common slave identifier and a second common slave identifier common to at least one other slave device associated with the single wire communications bus; and
    functional circuitry configured to selectively determine whether to respond to a message received on the single wire communications bus when:
       the message includes the first common slave identifier and a register map address received in the message acts on a first register map address associated with the slave device; or
       the message includes the second common slave identifier and a register map address received in the message acts on a second register map address associated with the slave device.

11. The slave device of claim 10 wherein the slave device is uniquely identified based on the register map address acted on by the message provided on the single wire communications bus.

12. The slave device of claim 10 wherein the communications circuitry is further configured to respond to the message.

13. The slave device of claim 10 wherein the communications circuitry is configured to send an acknowledgment signal to a bridge bus controller if the message contains a write command, and the message is correctly received by the slave device.

14. The slave device of claim 10 wherein the communications circuitry is further configured to transmit the data if the message contains a read command.

15. A method of communicating on a single wire communications bus, the method comprising:
coupling a plurality of slave devices to the single wire communications bus, each one of the plurality of slave devices associated with a first common slave identifier and a second common slave identifier; and
receiving a message on the single wire communications bus, the message comprising data, a slave identifier, and a register map address; and
selectively determining whether to respond to the message received on the single wire communications bus;
responding, by a respective one of the plurality of slave devices, to the message received on the single wire communications bus when:
the slave identifier in the message is the same as the first common slave identifier and the register map address in the message acts on a first register map address associated with the respective one of plurality of slave devices; or
the slave identifier in the message is the same as the second common slave identifier and the register map address in the message acts on a second register map address associated with the respective one of plurality of slave devices.

16. The method of claim 15 further comprising translating, by a bridge bus controller, one or more commands in the message from a first bus protocol to a single wire communications bus protocol.

17. The method of claim 16 further comprising:
receiving, at the bridge bus controller, an acknowledgment signal from the respective one of the plurality of slave devices for a write command sequence; and
storing the data for the respective one of the plurality of slave devices in a memory within the bridge bus controller for the respective one of the plurality of slave devices if the acknowledgement signal for the respective one of the plurality of slave devices is valid.

18. The method of claim 17, further comprising providing, via the bridge bus controller, the data stored in the memory in a data frame of a read command sequence of the first bus protocol.

* * * * *